May 3, 1927.
M. OUTHIER
1,627,404
NUT LOCK
Filed June 19, 1925
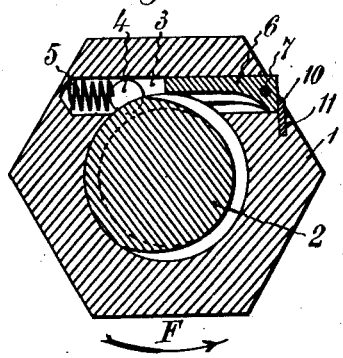
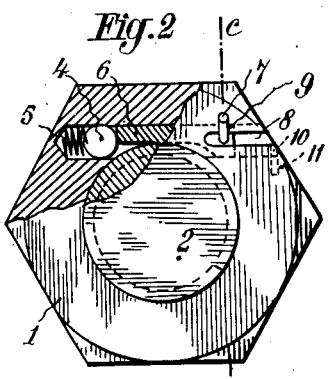
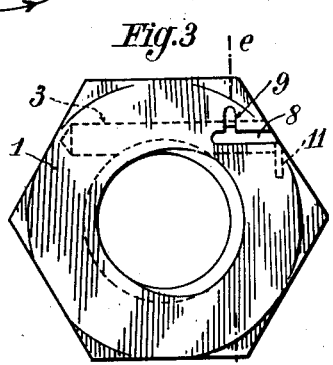
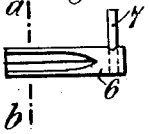
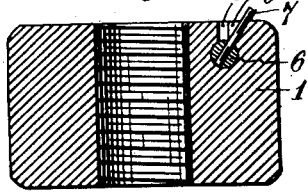
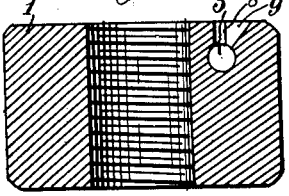
Inventor
Marcel Outhier
By Edward C. Sarnett,
Attorney.

Patented May 3, 1927.

1,627,404

UNITED STATES PATENT OFFICE.

MARCEL OUTHIER, OF PARIS, FRANCE, ASSIGNOR TO SOCIETE ANONYME DES ETABLISSEMENTS KIBLOK, OF LEVALLOIS-PERRET, FRANCE.

NUT LOCK.

Application filed June 19, 1925, Serial No. 38,242, and in France April 4, 1925.

The invention relates to a releasing device for nut locks of the kind in which the automatic locking action is obtained by means of a ball which, under the action of a spring, is jammed between the wall of its seat and the top or the sides of the thread of the bolt spindle.

But, in order to unlock rapidly the nut, the working of the device to be used must be easy and must ensure an entire safety, without however increasing substantially the cost-price of the nut.

The device, object of the present invention, combines these different advantages and its embodiment is illustrated, by way of example, in the accompanying drawings, in which:

Fig. 1 is a sectional view through the axis of the ball channel, the nut being locked.

Fig. 2 is a plan view, with partial section, of the nut screwed on the bolt spindle, but unlocked.

Fig. 3 is a plan view of the nut without locking or unlocking device.

Fig. 4 is a view of the unlocking device.

Fig. 5 is a section on line $a$—$b$ of Fig. 4.

Fig. 6 is a section on line $c$—$d$ of Fig. 2.

Fig. 7 is a section on line $e$—$f$ of Fig. 3.

The nut 1 is provided tangentially to the threads of the bolt spindle 2 with a channel 3 in which are located the locking ball 4 and its spring 5 and a push bar 6.

If the nut 1, the members of which are in the position shown in Fig. 1, is turned in the direction indicated by the arrow F, the ball 4, pushed by the spring 5 against the top of the thread of the spindle 2, tends to be jammed between the wall of its seat 3 and the top of the thread. In order to release the nut, it is sufficient to push the ball 4 back towards the bottom of its seat. Such movement of the ball is effected by means of the longitudinal displacement of the push bar 6. The latter, the shape of which is indicated in Figs. 4 and 5, is provided with a vertical rod 7 which projects out of the nut 1. When the push bar 6 is pushed back in the inside of the channel 3, the rod 7 slides freely in a groove provided on the nut in a parallel direction to the channel 3. Towards the end of this groove 8 on the side of the axis of the nut, a second groove 9 ends, the axis of which is perpendicular or oblique relatively to that of the groove 8 and the walls of which are slightly inclined, as shown in Figs. 6 and 7.

In order to unlock the nut push bar 6 is moved inwardly by pressure on rod 6 with the hand or a suitable tool until said rod comes opposite groove 9, whereupon the push bar is rotated slightly to bring the rod into this groove, which locks the push bar against outward movement. The push bar in moving to this position disengages ball 4 from the threads of bolt 2. It will be observed from Figs. 1, 4 and 5 that push bar 6 is formed with a slot in its inner side which permits the bar to be pushed inwardly over the thread on bolt 2.

In order to lock the nut, the rod 7 is drawn out of the groove 9 by means of the tool; as soon as the rod 7 is thrust in the groove 8, it may be left and the spring 5 pushes then back the push bar 6 by means of the ball 4.

In order to prevent the push bar 6 from leaving the channel 3, a locking stop or any suitable device is engaged in an opening 11, the axis of which is perpendicular to that of the channel 3 and the depth of which is lower than the length of the stop 10, so that the end of the latter projects behind the push bar 6 which buffers against it.

The stop 10 and the opening 11 may be also replaced by a clenching of metal which will be obtained by means of a bodkin and which will partly close the section of the channel 3.

The dismounting and the replacement of the unlocking members are very easy because it is sufficient to remove the stop 10 or to make the metal clenching fall for being able to remove the push bar 6, then the ball 4 and the spring 5.

The presence of the unlocking device does not increase much the cost-price of the nut, because it is sufficient to manufacture a pushbar of easy construction, then to mill, in the nut, two grooves and a little recess.

Further, this device ensures an entire safety because, when the rod 7 is engaged in the groove 8 or at the bottom of the groove 9, it cannot come out either owing to the presence of the stop 10 or of the metal clenching, or owing to the antagonist action of the spring 5.

What I claim is:

A nut lock comprising in combination a nut having a threaded opening and a channel tangential thereto, a ball and a spring in said channel, the spring tending to hold the ball in locking position, a push bar reciprocable in the channel and provided with a lateral extending rod projecting out of the nut, the nut being formed with a groove in which said rod is adapted to slide and with a transverse recess communicating with the groove near the inner end thereof, said transverse recess being adapted to receive said rod and hold it in unlocking position.

In testimony whereof I hereunto affix my signature.

MARCEL OUTHIER.